Oct. 24, 1950          A. B. MULL          2,527,027
SUN GOGGLE
Filed April 5, 1946
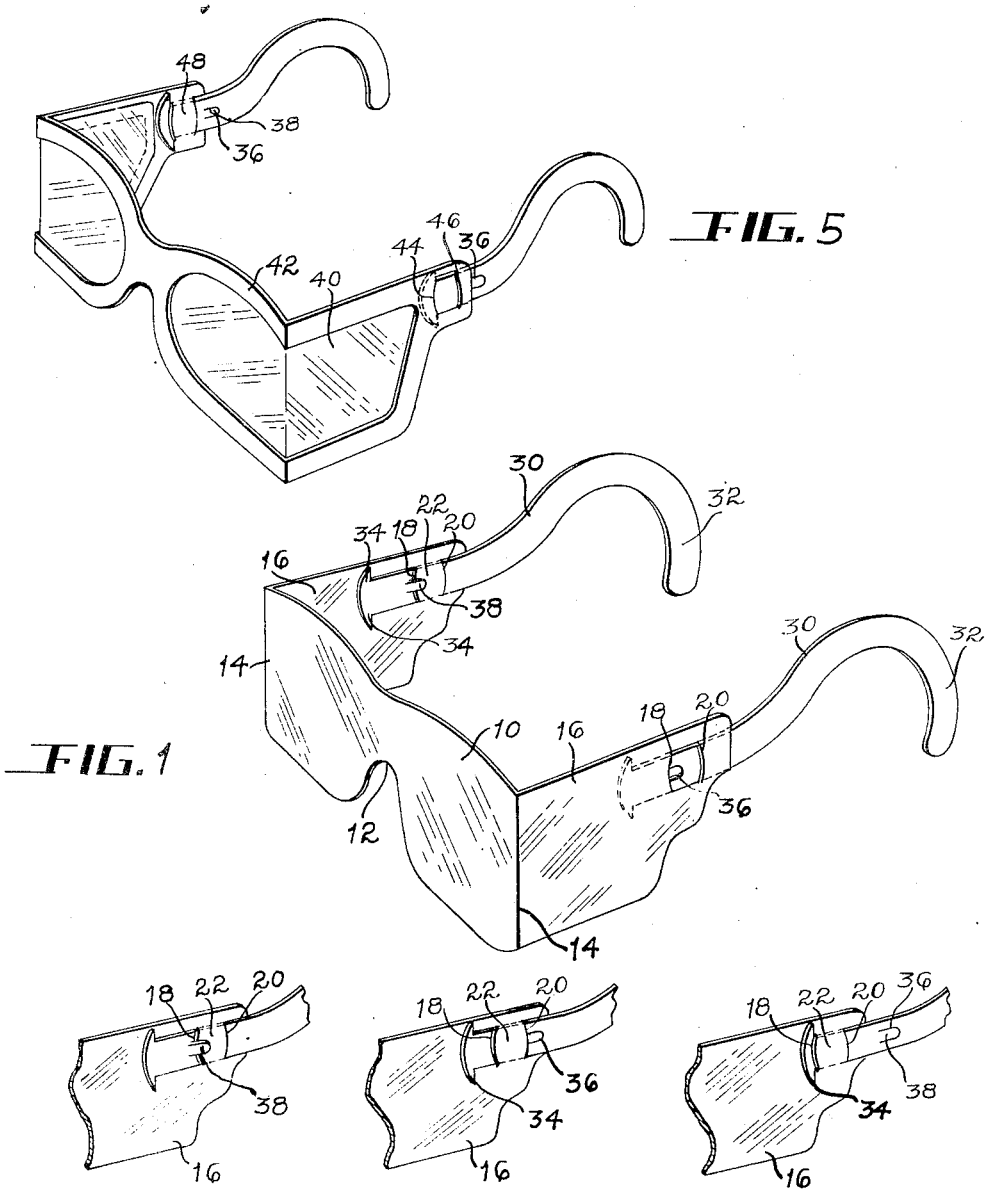
INVENTOR.
Arthur B. Mull
BY
Henry G. Lybrig
ATTORNEY Patented Oct. 24, 1950

2,527,027

UNITED STATES PATENT OFFICE 2,527,027

SUN GOGGLE

Arthur B. Mull, Hollywood, Calif., assignor of one-half to Spotswood Specialty Co. Inc., Lexington, Ky., a corporation of Kentucky Application April 5, 1946, Serial No. 659,931

3 Claims. (Cl. 2—14)

This invention relates to sun goggles and more particularly to sun goggles made from flexible sheet material.

An object of this invention is to provide sun goggles made from flexible sheet material provided with temples that are adjustable to various sizes, so as to accommodate the requirements for various uses. For example, the sun goggles may be worn by a child, by an adult who does not wear glasses or by an adult who wears glasses.

Another object of this invention is to provide temples for sun goggles that may be adjusted by steps or stages to various lengths.

Another object of this invention is to provide sun goggles that are produced economically, that are efficient and that may be folded so as to be carried in a pocket, purse, billfold or the like.

Other objects and advantages reside in the construction of parts, the combination thereof and the mode of operation, as will become apparent from the following description.

Referring to the drawings, Figure 1 is a perspective view of the preferred embodiment.

Figures 2, 3 and 4 are fragmentary perspective views of the adjustable portion of the temples and the adjacent portion of the goggles.

Figure 5 is a perspective view of a modification.

In the drawings, the reference character 10 indicates the main body portion of the sun goggles. This main body portion may be made from any suitable flexible, tinted, transparent or semi-transparent sheet material. It is preferably provided with an arcuate slot 12 to accommodate the nose. The sheet material extends at right angles along the lines 14, so as to form the side pieces 16. Each of the side pieces 16 is provided with a pair of slots 18 and 20 on opposite sides of a loop portion 22.

Temple members 30 are provided with hook-shaped ends 32, adapted to be positioned over the ear. The temple members 30 extend through the slots 18 and 20, so as to underlie the loop portion 22. Suitable tabs 34 project outwardly from the ends of the temples 30, so as to provide a stop for the temples, which stop engages the loop portion 22, as shown in Figure 4, unless the temples are held in some other adjusted position. Each of the temples is provided with a U-shaped slot or incision 36 forming a U-shaped tab 38. The tabs 38 may be deflected from the plane of the main body of the temples. This permits adjustment of the temples to various sizes.

When the temples are adjusted into the position shown in Figure 4, the temples are in the extended position, which may be referred to as the full size. For medium size, the U-shaped tabs 38 may engage the wall of the slot 20, so as to be held in the position shown in Figure 3. For the small size, the temple may be retracted into the position shown in Figure 2, wherein the tab 38 engages the side of the loop portion 22. This may be referred to as the child's size. From this it may be clearly seen that the goggles may be adjusted to accommodate various users, the tab 38 being adapted to engage the wall of either one of the slots, or it may be aligned with the main body portion of the temple, when the extensions 34 retain the temples in position.

In the modification disclosed in Figure 5, the tinted, transparent lens material 40 is surrounded by a reenforcing marginal strip 42 that gives the lens portion 40 rigidity. The marginal portion 42 is provided with a pair of slots 44 and 46, corresponding with the slots 18 and 20 in the preferred embodiment, the slots cooperating to form the boundary of a loop portion 48, corresponding to the loop portion 22. The temples used in connection with this modification are identical to those used in connection with the preferred embodiment.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A sun goggle including flexible transparent sheet material forming a lens portion, said sheet material terminating in a pair of side portions adapted to extend rearwardly on the side of the face, each of said side portions including a pair of slots so as to form a loop-like portion between the slots, and a pair of temple members each terminating in an arcuate portion, said temple members extending through said slots so as to be held in position by the loop-like portion, each of said temple members having an enlarged end preventing the temple member from passing outwardly through its loop-like portion, and each of said temple members being provided with a tab portion adapted to project either outwardly or inwardly to engage the edge of one of said slots so as to hold the temples in adjusted position.

2. A sun goggle including flexible transparent sheet material forming a lens portion, said sheet material terminating in a pair of side portions adapted to extend rearwardly on the side of the face, each of said side portions including a pair of slots so as to form a loop-like portion between the slots, and a pair of temple members each extending through said slots so as to be held in position by said loop-like portion, each of said temple members having an enlarged end limiting the movement of the temple member with respect to its loop-like portion, and each of said temple members being provided with a tab portion adapted to project either outwardly or inwardly to engage the edge of one of said slots so as to hold the temples in adjusted position.

3. A sun goggle including flexible transparent sheet material forming a lens portion, said sheet material terminating in a pair of side portions adapted to extend rearwardly on the side of the face, each of said side portions including a pair of slots so as to form a loop-like portion between the slots, and a pair of temple members each terminating in an arcuate portion, said temple members extending through said slots so as to be held in position by the loop-like portion, said temple members having a plurality of tabs, one of said tabs projecting outwardly, another tab being substantially U-shaped bounded by a U-shaped slot in the temple member, one of said tabs being selected to engage either one of the slots forming the loop-like portions so as to hold the temple members in adjusted position.

ARTHUR B. MULL.

REFERENCES CITED

The following references are of record in the file of this patent:

UNITED STATES PATENTS

| Number | Name | Date |
| --- | --- | --- |
| 1,082,848 | Dargin | Dec. 30, 1913 |
| 1,319,639 | Brubaker et al. | Oct. 21, 1919 |
| 2,202,644 | Blossom | May 28, 1940 |
| 2,362,917 | Malcom | Nov. 14, 1944 |

FOREIGN PATENTS

| Number | Country | Date |
| --- | --- | --- |
| 206,703 | Great Britain | Nov. 15, 1923 |